(12) United States Patent
Frame et al.

(10) Patent No.: US 10,579,193 B2
(45) Date of Patent: Mar. 3, 2020

(54) SPATIAL-FREQUENCY-BASED CAPACITIVE MOTION SENSOR AND METHOD OF USING THE SAME

(71) Applicant: Cypress Semiconductor Corporation, San Jose, CA (US)

(72) Inventors: John Frame, Arcadia, CA (US); Victor Kremin, Lviv (UA); Andriy Ryshtun, Lviv (UA); Dmytro Puyda, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 50 days.

(21) Appl. No.: 15/926,175

(22) Filed: Mar. 20, 2018

(65) Prior Publication Data

US 2019/0187829 A1 Jun. 20, 2019

Related U.S. Application Data

(60) Provisional application No. 62/598,618, filed on Dec. 14, 2017.

(51) Int. Cl.
*G06F 3/044* (2006.01)
*G06F 3/041* (2006.01)

(52) U.S. Cl.
CPC ............ *G06F 3/044* (2013.01); *G06F 3/0445* (2019.05); *G06F 3/0446* (2019.05); *G06F 3/04166* (2019.05); *G06F 3/0443* (2019.05); *G06F 2203/0338* (2013.01)

(58) Field of Classification Search
CPC ..... G06K 9/0002; G06F 3/044; G06F 3/2203; G06F 3/0338
See application file for complete search history.

(56) References Cited

U.S. PATENT DOCUMENTS

| 7,138,620 B2 | 11/2006 | Trisnadi et al. |
| 7,297,912 B1 | 11/2007 | Todoroff et al. |
| 7,728,816 B2 | 6/2010 | Xu et al. |

(Continued)

FOREIGN PATENT DOCUMENTS

WO 2017039788 A1 3/2017

OTHER PUBLICATIONS

Kyung-Hoon Song, "A Method for Enhancing the Sensing Distance of a Fingerprint Sensor", MDPI Article, Oct. 7, 2017; 10 pages.

(Continued)

*Primary Examiner* — Chad M Dicke

(57) ABSTRACT

A spatial frequency based capacitive motion sensor and method of operating the same are disclosed. In one embodiment, the motion sensor includes an array of sense cells to capacitively sense capacitance variations induced by a surface in proximity to the array. The motion sensor further includes processing circuitry including a multiplexer and a processor to process motion dependent output signals from the array to measure motion of the surface in a direction parallel to a surface of the array. Generally, processor is adapted to execute a program to control the multiplexer to interconnect the sense cells of the array to configure the array as a comb-filter to detect at least one spatial frequency component of the capacitance variations, and to measure motion of the surface in a direction parallel to the array. Other embodiments are also disclosed.

20 Claims, 16 Drawing Sheets

(56) References Cited

U.S. PATENT DOCUMENTS

| | | | |
|---|---|---|---|
| 8,086,417 B2 * | 12/2011 | Seguine | G01D 5/24 |
| | | | 324/662 |
| 8,217,334 B1 | 7/2012 | Lang et al. | |
| 8,315,444 B2 | 11/2012 | Gardner | |
| 8,471,570 B2 * | 6/2013 | Portmann | G06F 3/0416 |
| | | | 178/18.06 |
| 8,547,336 B1 | 10/2013 | Xu et al. | |
| 9,083,345 B2 * | 7/2015 | Kraus | H03K 17/002 |
| 9,395,317 B2 | 7/2016 | Cannon et al. | |
| 9,652,091 B1 * | 5/2017 | Obeidat | G06F 3/044 |
| 9,704,012 B2 | 7/2017 | Kravets et al. | |
| 2004/0081339 A1 * | 4/2004 | Benkley, III | G06K 9/0002 |
| | | | 382/124 |
| 2006/0106319 A1 * | 5/2006 | Todoroff | G06F 3/0317 |
| | | | 600/476 |
| 2015/0346862 A1 * | 12/2015 | Schwartz | G06F 3/0418 |
| | | | 345/174 |
| 2016/0117048 A1 | 4/2016 | Frame et al. | |
| 2016/0140376 A1 * | 5/2016 | Kremin | G06K 9/0002 |
| | | | 382/124 |
| 2017/0068838 A1 | 3/2017 | Kravets et al. | |
| 2017/0329456 A1 * | 11/2017 | Leigh | G06F 3/0412 |

OTHER PUBLICATIONS

Search Report of the International Searching Authority for International Application No. PCT/US18/58469 dated Feb. 6, 2019; 2 pages.

Written Opinion of the International Searching Authority for International Application No. PCT/US18/58469 dated Feb. 6, 2019; 4 pages.

* cited by examiner

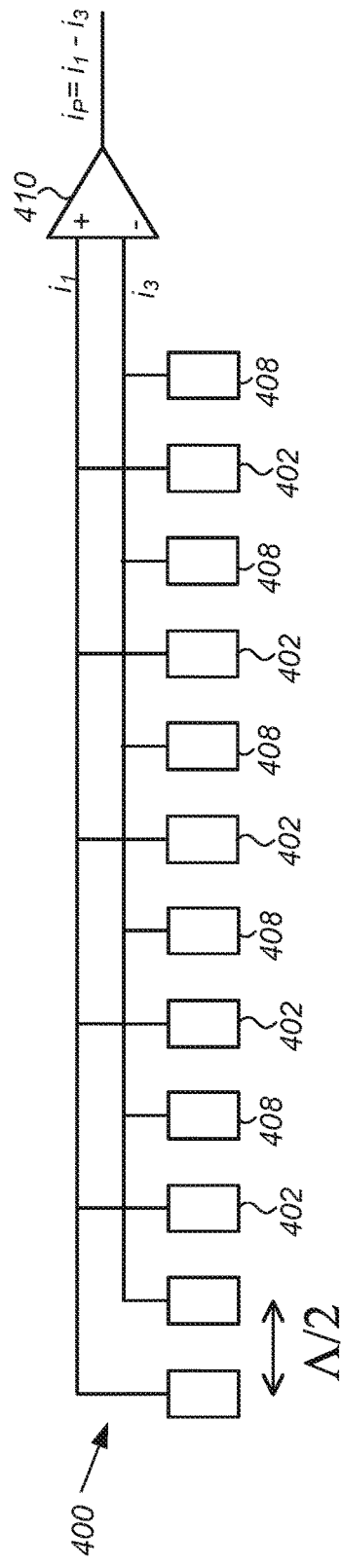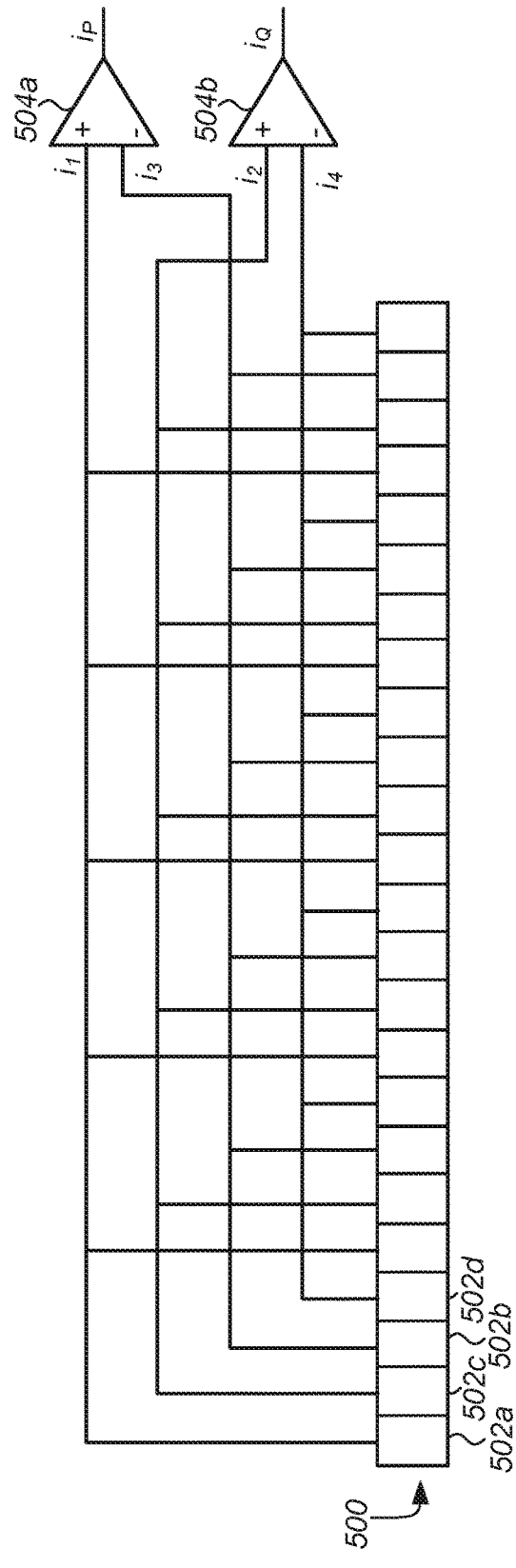
FIG. 4C
FIG. 5

*FIG. 11A*

*FIG. 11B*

SPATIAL-FREQUENCY-BASED CAPACITIVE MOTION SENSOR AND METHOD OF USING THE SAME

CROSS-REFERENCE TO RELATED APPLICATIONS

This application claims the benefit of priority under 35 U.S.C. 119(e) to U.S. Provisional Patent Application Ser. No. 62/598,618, filed Dec. 14, 2017, which is incorporated by reference herein in its entirety.

TECHNICAL FIELD

This disclosure relates generally to motion sensors and more particularly to capacitive motion sensors including an array of sense cells and using spatial frequency detection to detect motion of a surface relative to the array.

BACKGROUND

Motion sensors that are capable of tracking movement of a finger or stylus over a surface are well known and widely used in systems, such as finger navigation systems, to move a cursor or input data. Generally, conventional motion sensors can be classified as one of two types depending on the means by which a surface of the finger or stylus is sensed, either optically or capacitively.

Optical navigation sensors use a laser or LED light source and photodiode array to detect motion based on either an image of the surface of the finger or a random intensity distribution of light known as speckle generated by scattering coherent light from a rough surface. Motion can then be determined by an algorithm using image correlation by detecting movement of the image of the surface of the finger, or by a spatial frequency calculation of the speckle. Optical navigation sensors typically have a high cost and a relatively large size due to a requirement for laser or light source, which must be internally shielded from the photodiode array, and the need for a precision optical assembly to project light reflected from the surface of the finger on to the photodiode array. Optical navigation sensors are also sensitive to ambient lighting, and can incorrectly detect motion when no surface is present due to changes in background light. Finally, image correlation motion calculation can be computationally intensive and requiring expensive processing circuitry.

The most common type of capacitive motion sensor is a capacitive trackpad, which uses a small array of capacitive sensors to detect a finger location, and determines motion by comparing a number of sequential finger locations. Thus, it will be understood that a significant disadvantage of capacitive trackpads is that they must always be larger than a surface of the finger, since a capacitive trackpad does not work if the surface to be tracked covers the entire array of capacitive sensors, and are generally much larger to detect the location of the finger in multiple sequential locations. Thus, a large trackpad is difficult to fit into many applications where surface area is limited. Additionally, a capacitive trackpad does not work for high speed motion due to time taken to detect location. Tracking higher-speed motion requires a larger array of capacitive sensors.

Another type of capacitive sensor is a fingerprint sensor. Fingerprint sensors use a capacitive array to detect a fingerprint image by sensing the capacitive differences between finger ridges and valleys. In the past there have been attempts to use fingerprint sensors as motion sensors by comparing subsequent images and performing an image correlation calculation at each possible offset to detect motion. However, speed is limited by the time required to capture the fingerprint image and/or the time to perform the image correlation. Faster motion requires faster image capture and faster calculations, limiting maximum speed, or increasing sensor area. Moreover, the calculations often require high-performance processors, increasing cost. Finally, the capture and transfer of fingerprint image gives rise to many security and privacy concerns.

Accordingly, there is a need for an inexpensive motion sensor capable of detect motion high speeds, with less required processing power, and a smaller sensing area. It is further desirable that the motion sensor achieves these objectives without giving rise to the security concerns that result from detecting and storing a fingerprint image.

SUMMARY

A spatial frequency based capacitive motion sensor and method of operating the same are provided. In one embodiment, the motion sensor includes an array of sense cells to capacitively sense capacitance variations in a structure of a surface in proximity to the array. The motion sensor further includes processing circuitry including a multiplexer and a processor to process motion dependent output signals from the array to measure motion of the surface in a direction parallel to a surface of the array. Generally, processor is adapted to execute a program to control the multiplexer to interconnect the sense cells of the array to configure the array as a comb-filter to detect at least one spatial frequency component of the capacitance variations, and to measure motion of the surface in a direction parallel to the array. In some embodiments, the processing circuitry and array is further configured to enable a pitch of sense cells and size of the array to be dynamically changed in operation to adapt to a different spatial frequency that might arise from a change in the capacitance variations of the surface to generate output signals having the greatest strength for the surface for which motion is being detected.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

FIG. 4C is a schematic block diagram of a 1D array of capacitance sense cells including a number of interleaved sense cells combined using a differential detector to remove a DC component from the output;

FIG. 5 is a schematic block diagram of a 1D array of capacitance sense cells for spatial frequency based detection of motion in one dimension;

FIG. 11A is a schematic block diagram of a portion of 2D array of capacitance sense cells illustrating four blocks of sense cells;

FIG. 11B is a schematic block diagram of a portion of 2D array of sense cells illustrating an alternate configuration for spatial frequency-based detection of motion in two-dimensions.

Figure 1:
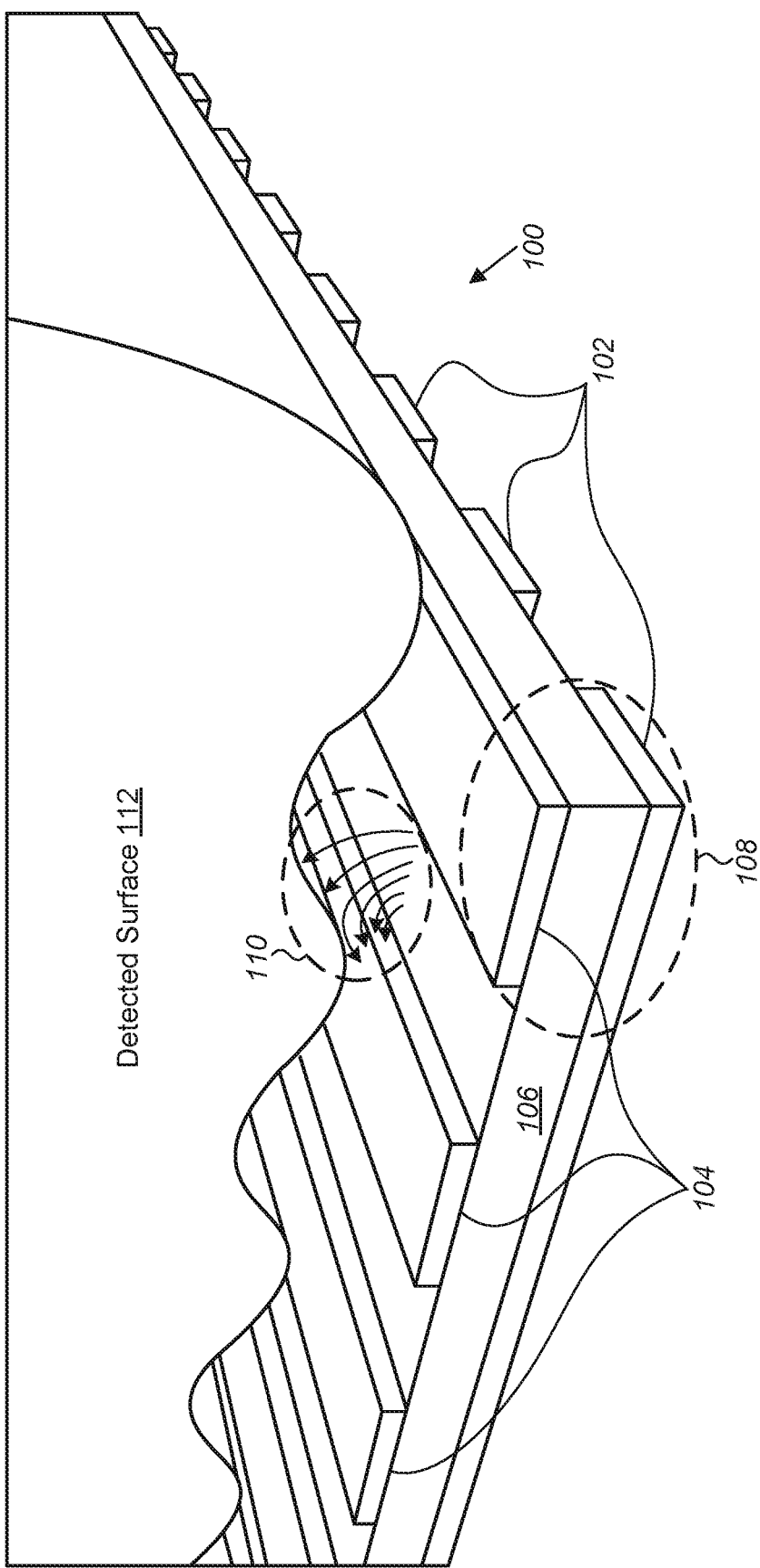
FIG. 1 is a schematic block diagram of a portion of a capacitance array.

The features and advantages of embodiments of the present invention will become more apparent from the detailed description set forth below when taken in conjunction with the drawings. In the drawings, like reference numbers generally indicate identical, functionally similar, and/or structurally similar elements.

DETAILED DESCRIPTION

This specification discloses one or more embodiments that incorporate the features of this invention. The disclosed embodiment(s) merely exemplify the present invention. The scope of the present invention is not limited to the disclosed embodiment(s). The present invention is defined by the claims appended hereto.

The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Before describing the various embodiments in more detail, further explanation shall be given regarding certain terms that may be used throughout the descriptions.

By "spatial frequency" it is meant either a characteristic or feature of any structure or surface that is periodic across position in space, or a number of cycles in a generally sinusoidal signal per unit time. A surface can be made up of a superposition of a potentially infinite number of individual spatial frequencies, depending on the characteristic or feature being sensed and the design of a spatial frequency based motion sensor used to detect motion. Thus, spatial frequency based motion sensor as used herein refers to one designed to sense one or a small number of spatial frequency components of the capacitance variations arising from variations in the structure of a surface moved relative to a motion sensor, and which detects motion by movement of the detected spatial frequency or frequencies across the motion sensor. As described in further detail below the variations in capacitance can arise from ridges and valleys of a fingerprint moved across the detector or the texture of fabric on a gloved finger.

Figure 6A:
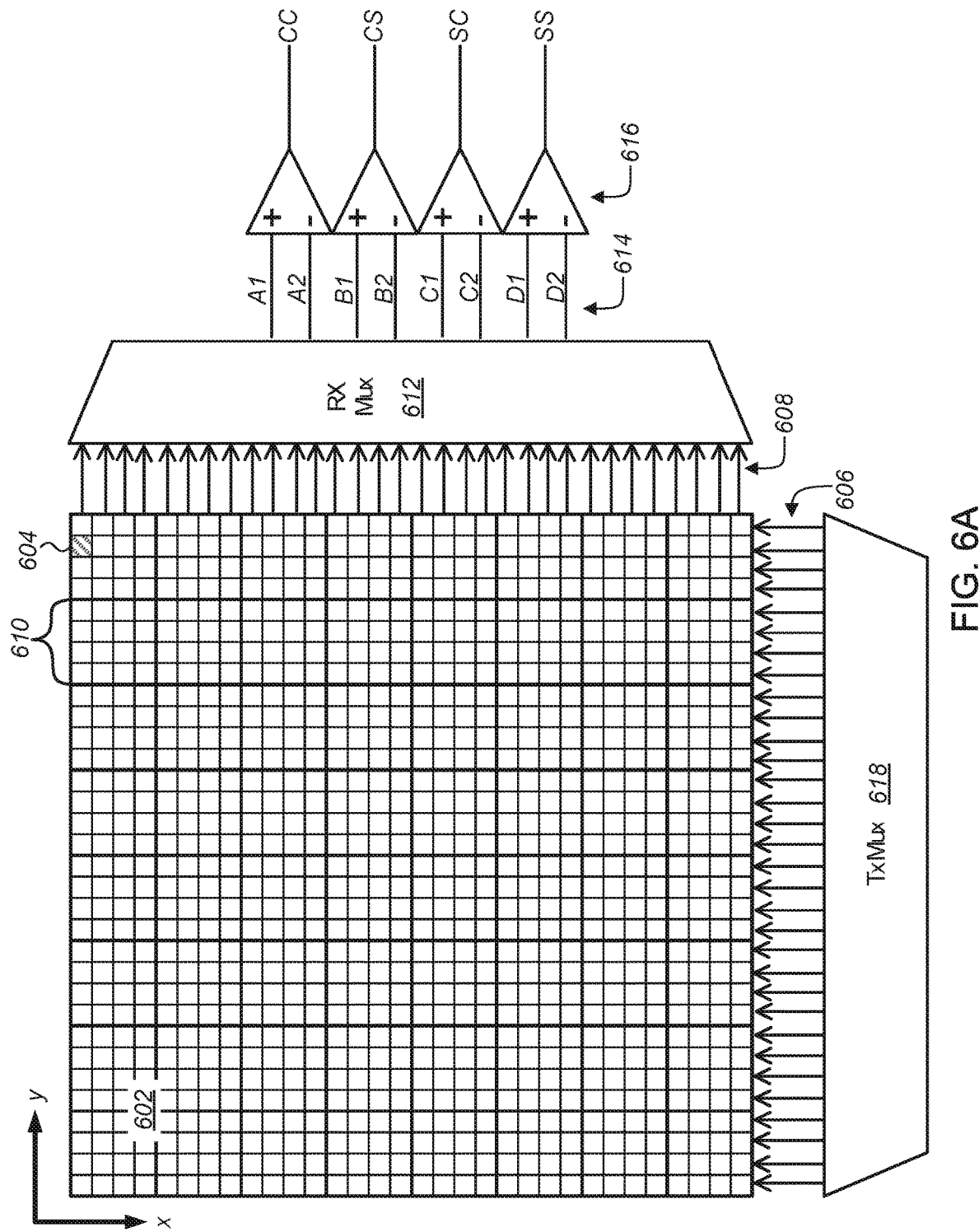
FIG. 6A is a schematic block diagram of a two-dimensional (2D) array of capacitance sense cells for spatial frequency-based detection of motion in two-dimensions.
Figure 6B:
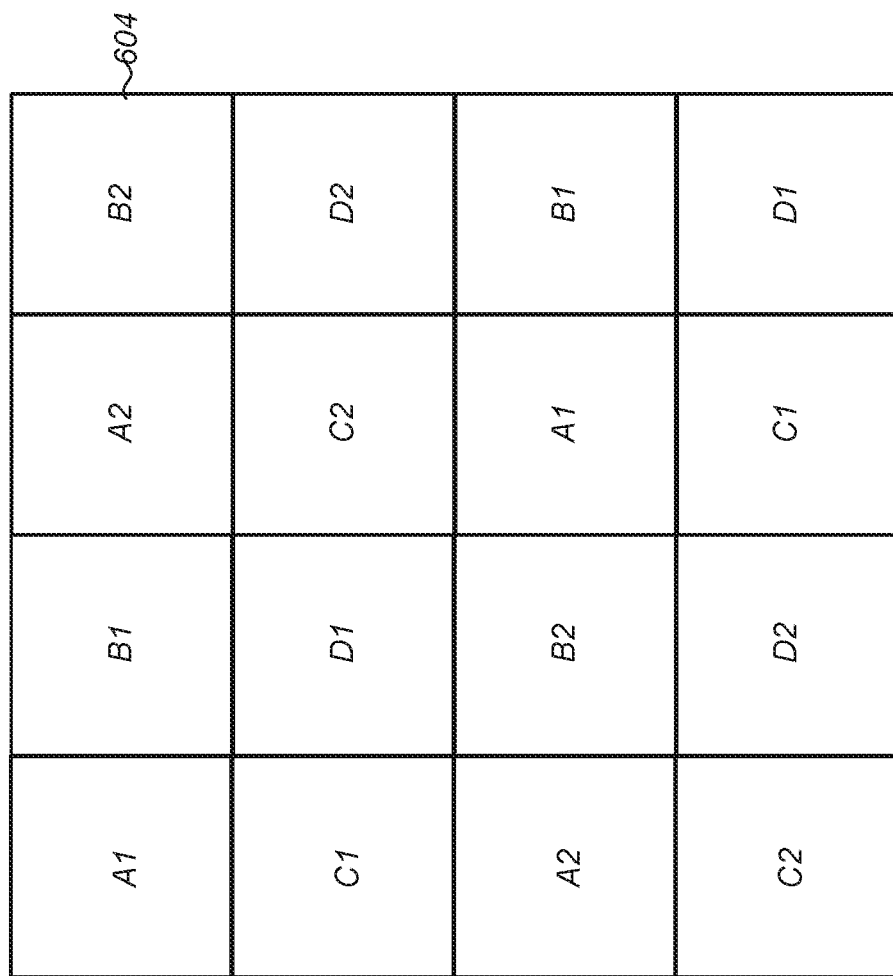
FIG. 6B is a schematic block diagram of a block of sense cells from the array of FIG. 6A.

The term "comb-array" or an "array configured as a comb-filter" is used herein to generally describe an array of capacitive detectors that are connected in a periodic manner, so that the array acts as a filter for one spatial frequency component (and its odd harmonics) of an output signal from the array. By a one-dimensional (1D) array configured as a comb-filter it is meant multiple sense cells arranged along a single, long axis and having a width along a short axis substantially equal to a width of the sense cells. Examples of such a 1D array are shown in FIGS. 4A-4C and 5, described in further detail below. By a two-dimensional (2D) array configured as a comb-filter it is meant multiple sense cells arranged along at least two non-parallel axes. One example of such a 2D array is shown in FIGS. 6A and 6B, described in further detail below, in which multiple sense cells are arranged in a rectangular or square array. It is noted that while the 2D array shown in this particular embodiment appears to be merely multiple instances of adjacent 1D array, the 2D array differs from the 1D array in that the capacitive sense cells are connected in a periodic manner with other sense cells in both the x and the y directions. It is further noted that while the 2D array of FIGS. 6A and 6B is rectangular, this need not be the case in every embodiment. For example, the 2D array could include an array of sense cells arranged along three non-parallel axes to form a hexagonal 2D array.

The capacitive spatial frequency-based motion sensor of the present disclosure can be implemented with various types of capacitance sense cells, including mutual capacitance sense cells and self-capacitance sense cells, also known as absolute capacitive sensing elements.

Operating principles of mutual capacitance sense cells will now be described with reference to FIG. 1. FIG. 1 is a schematic block diagram of a portion of a mutual capacitance sense cell array 100. The array 100 consists of rows and columns of transmit (Tx) electrodes 102 and overlying receive (Rx) electrodes 104 separated by an insulating dielectric layer or insulator 106. Each intersection of Tx and Rx electrodes forms a detector or sense cell 108 in the array. In some embodiments the insulator 106 includes a transparent material such as glass, while the Tx and Rx electrodes 102, 104, are formed from layers of a conducting material. In some embodiments the conducting material is optically clear, and/or sufficiently thin to allow at least some wavelengths of light to pass through the array 100 substantially un-attenuated, thereby enabling the capacitive spatial frequency based motion sensor to be used with a display, such as a screen of a cellular telephone, or an optical finger print sensor.

In operation, when a signal is applied to a Tx electrode 102, electric field lines 110 are generated inducing a current in an Rx electrode 104. The RX sense electrode received signal depends on the coupling capacitance between the Tx and Rx electrodes 102, 104. This is the so-called mutual capacitance. When a conductive object or surface 112, or one with non-unity permittivity, is brought in close proximity to the Rx electrodes 104, the mutual capacitance changes. By measuring the change in signal at the Rx electrode 104 compared to the signal when no surface with non-unity permittivity is in proximity thereto, the mutual capacitance change due to the surface 112 can be calculated. Using an array 100 of such mutual capacitance sense cells 108, and scanning the Tx and Rx electrodes 102, 104, motion can be determined from a limited number of signals as described in further detail below. When a fingerprint is moved across or relative to the sense cell, variations or changes the cell mutual capacitance resulted in a signal change in the receive circuit.

Alternatively, the array can be a self-capacitance array including a number of self-capacitance sense cells detecting capacitance between a top plate or electrode on the top surface a substrate or IC on which the array is formed and a ground plane on a lower surface of the substrate.

Figure 2:
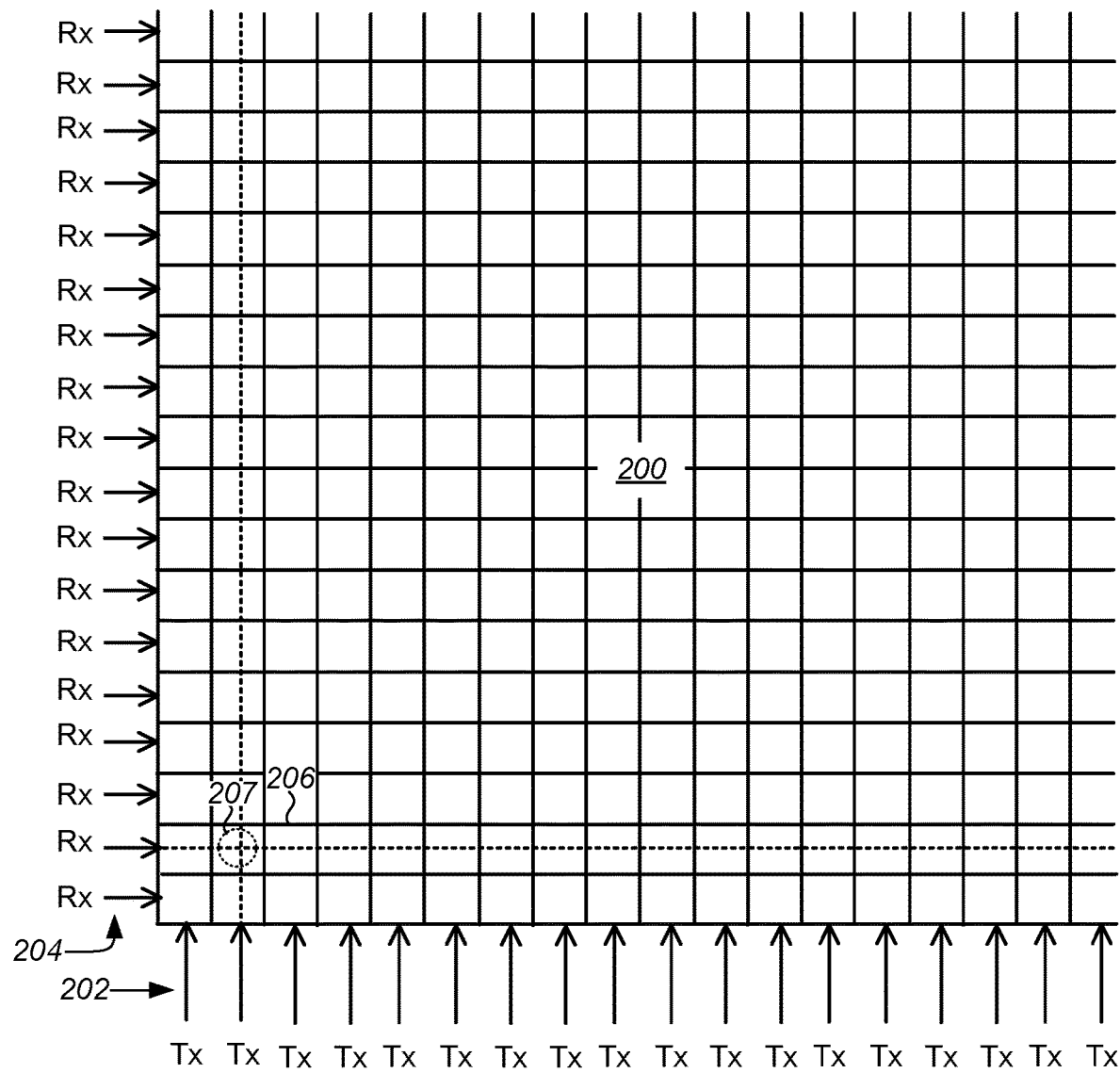
FIG. 2 is a schematic representation of a portion of a capacitance array, with transmit (Tx) electrodes depicted as rows, and receive (Rx) electrodes depicted as columns.

FIG. 2 is a schematic representation of a portion of a capacitance array 200, with transmit (Tx) electrodes 202 depicted as rows, and receive (Rx) electrodes 204 depicted as columns. Each square 206 in the figure represents the area of capacitance to be measured by a particular sense cell 207 formed at an intersection of the Tx and Rx electrodes 202, 204. The overall size of the array 200 depends on dimensions of the Tx and Rx electrodes 202, 204, and the distance or spacing, also known as pitch, between adjacent Tx and Rx electrodes. Generally, the dimensions of the Tx and Rx electrodes 202, 204, and the spacing between adjacent Tx and Rx electrodes are selected based on an estimation of the spatial frequency content of the surface to be detected, and may or may not match the spatial frequency of protuberance or features in the structure of a surface to be detected.

Figure 3:
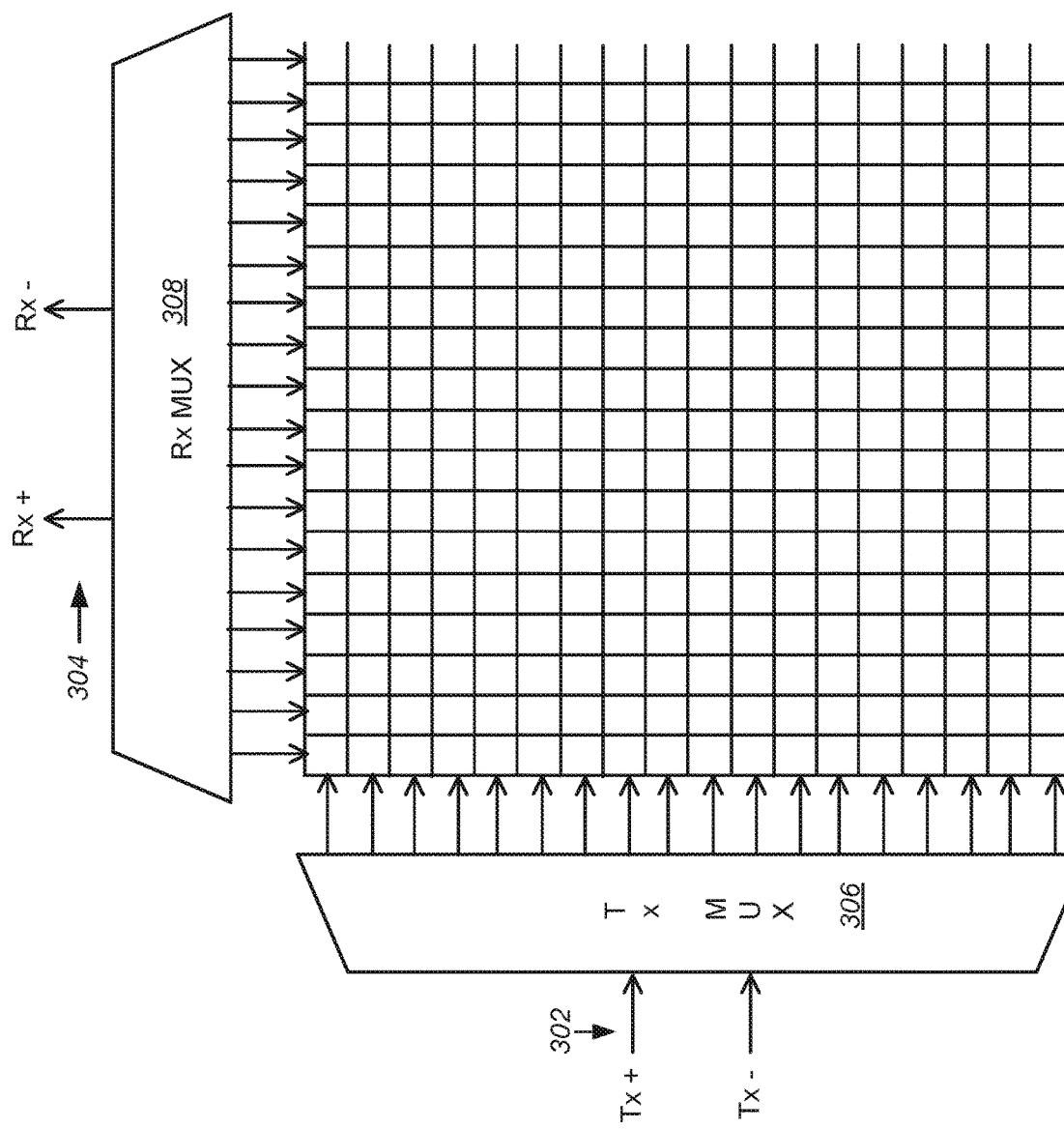
FIG. 3 is a block diagram of a portion of a capacitance array with transmit and receive multiplexers (MUX)

As noted above, the Tx electrodes in mutual capacitance arrays are driven with signals, and the Rx electrodes are connected to amplifiers or sensing circuits to measure the input signal and therefore capacitance of sense cells in the array. As shown in FIG. 3, to avoid excessive duplication of drive and sensing circuitry a limited number of Tx drive circuits 302 and Rx sensing circuits 304 are used, which are then connected to the array 300 via a Tx multiplexer (MUX 306) and a Rx multiplexer (MUX 308), respectively. Both the Tx drive circuits 302 and Rx sensing circuits 304 may be single-ended or differential, as shown in FIG. 3. For the Tx drive circuit 302 in differential mode, a Tx− signal is generated which is an inverted version of Tx+. For the Rx sensing circuit 304, the Rx+ and Rx− signals are connected to a positive and negative inputs to a differential detector (not shown in this figure). Alternatively, as explained in greater detail below with reference to FIGS. 9A-9C, the RX multiplexer 308 might be configured in such a way that each individual Rx electrode can be connected to the Rx+ line, Rx− line or be grounded. The TX multiplexer 306 might be configured in such a way that each individual panel Tx electrode can be connected to the Tx+ line, Tx− line or be grounded.

A linear or one-dimensional (1D) array for use in a spatial frequency-based motion sensor to measure motion of displacement in one-dimension will now be described with reference to FIG. 4A through FIG. 6.

Figure 4A:
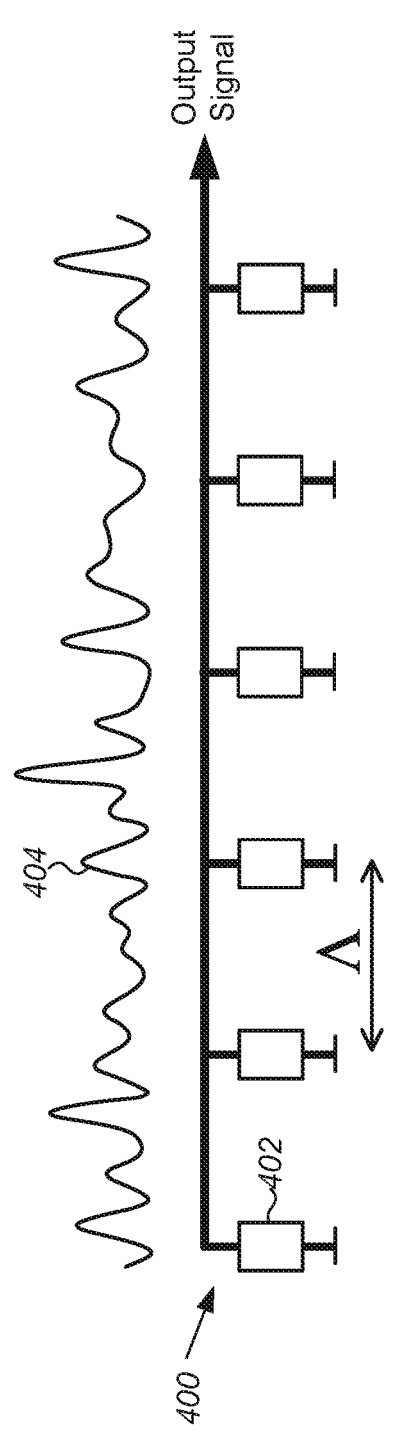
FIG. 4A is a schematic block diagram of a spatial frequency based linear or one-dimensional (1D) array of capacitance sense cells.
Figure 4B:
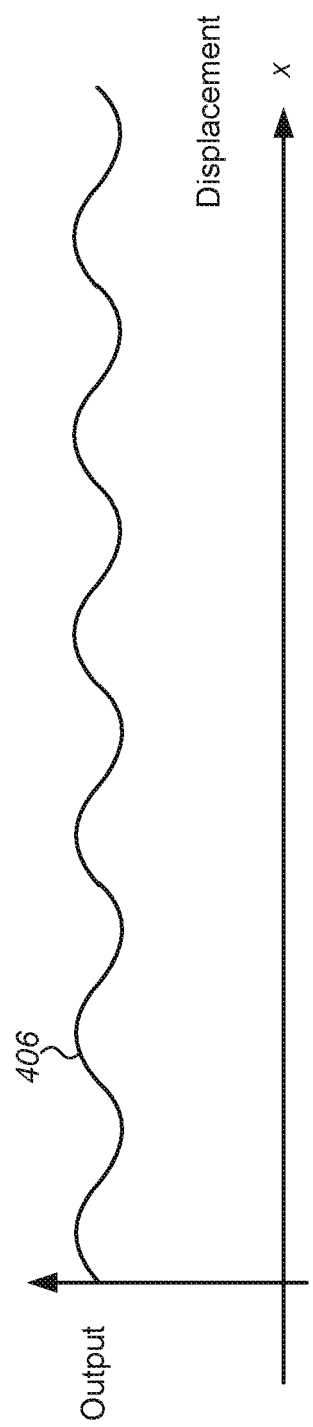
FIG. 4B is a graph of an output from the 1D array of FIG. 4A.

FIG. 4A is a schematic block diagram of 1D array 400 of mutual or self-capacitance sense cells 402 arranged along a single, long axis and having a width along a short axis substantially equal to a width of the sense cells. The sense cells 402 are spaced apart at an interval A and configured to measure an input spatial signal 404 consisting of variations in capacitance arising from variations in a surface with non-unity permittivity brought in close proximity to the 1D array. In operation the sense cells 402 are wire-summed or connected together, generating a single output signal 406 representing the sum of an output from each sense cell. The input spatial signal 404 is moved with respect to the 1D array 400, generating the output signal 406 that is a function of the amount of motion. Provided the input spatial signal 404 has some content at spatial frequency Λ, the output signal 406 will be a periodic signal with frequency Λ, as shown in FIG. 4B. This is because the overall size of the input spatial signal 404 is much larger than a period of the spatial frequency Λ, the array 400 is functions as a comb-array or comb-filter and processes information across multiple fundamental frequency spatial periods, which means that the entire input spatial signal measured at one time is very similar to that measured at another time. Displacement of the input spatial signal 404 relative to the 1D array 400 can be calculated by measuring a phase change of the output signal 406.

From FIG. 4B, it can be seen there is a large DC component to the output signal 406. By adding a second set of sense cells 408 coupled to an inverted input of a differential detector 410, as shown in FIG. 4C, the DC component can be removed. Referring to FIG. 4C, the total output signal $i_P$ from the differential detector 410 is the difference of the signals $i_1$ from the first set of sense cells 402 and $i_3$ from the set of sense cells 408. The differential detection and spacing of the sense cells 402, 408, in the array 400 of FIG. 4C causes the DC and even-order spatial harmonics to cancel. The output signal of output signal $i_P$ from the differential detector 410 is:

$$i_P = i_1 - i_3 = 2B\cos\left(\frac{2\pi x}{\Lambda}\right) \quad (1)$$

where x is the displacement, Λ frequency is of the output signal $i_P$, and B is a constant.

Note that the output signal $i_P$ from the array 400 of FIG. 4C cannot distinguish between positive and negative direction motion. That is the array 400 of FIG. 4C can detect motion and measure displacement, but cannot determine in which direction along the long axis of the array the displacement occurred.

By adding additional sense cells, as shown in FIG. 5, in-phase and quadrature portions of the output signal are created. Direction of displacement can therefore be determined by checking if the quadrature portion of the output signal ($i_Q$) leads or lags the in-phase portion of the output signal ($i_P$) in time. Alternatively, $i_P$ and $i_Q$ can be interpreted as real and imaginary components of a complex vector and motion direction can be determined by looking at a direction of the vector phase change.

Referring to FIG. 5 the 1D array 500 includes a first set of sense cells 502a, a second set of sense cells 502b, a third set of sense cells 502c, and a fourth set of sense cells 502d. Outputs ($i_1$) from the first set of sense cells 502a are wire-summed or connected together and coupled to a non-inverting input of a first differential detector 504a. Outputs ($i_3$) from the third set of sense cells 502c are connected together and coupled to an inverting input of the first differential detector 504a to generate the in-phase portion of the output signal ($i_P$). Outputs ($i_2$) from the second set of sense cells 502b are connected together and coupled to a non-inverting input of a second differential detector 504b. Outputs ($i_4$) from the fourth set of sense cells 502d are connected together and coupled to an inverting input of the second differential detector 504b to generate the quadrature portion of the output signal ($i_Q$). The in-phase portion of the output signal ($i_P$) is as given by equation (1) above. The quadrature portion of the output signal ($i_Q$) from the 1D array 500 of FIG. 5 is:

$$i_Q = 2B\sin\left(\frac{2\pi x}{\Lambda}\right) \quad (2)$$

where x is the displacement, Λ frequency is of the output signal $i_Q$, and B is a constant.

Note that despite the 1D array 500 including multiple individual sense cells 502a-d, connected in four (4) sets, there are only two output signals from the differential detectors 504a, 504b, connected to the 1D array—$i_P$ and $i_Q$.

In another embodiment, the array is a two-dimensional (2D) array including capacitive sense cells arranged in two dimensions, as shown in FIGS. 6A and 6B. FIGS. 6A and 6B are schematic block diagrams of a portion of a motion sensor including 2D array 602 of capacitive sense cells. Referring to FIG. 6A, each square 604 in the 2D array 602 represents the area of capacitance to be measured by a particular sense cell formed at an intersection of a Tx electrode 606 and an Rx electrodes 608. The 2D array 602 is further divided or arranged into groups or blocks of sense cells 610, each block of sense cells having capacitive sense cells arranged in a 4×4 elements-per-cell (or 4×4 elements/period) configuration. Capacitive sense cells within a block of sense cells 610 with the same letter, as shown in the detail of FIG. 6B, are electrically connected or wire-summed in a RX Mux 612 to yield eight signals 614, A1 through D2. The eight wire-summed signals 614 are further combined by differential detectors 616 to generate four output signals (CC, CS, SC and SS) containing the in-phase and quadrature information resulting from motion or displacement in the x and y directions. Each element of the block of sense cells 610 shown in FIG. 6B is connected to the positive (A1, B1, C1, D1) or negative (A2, B2, C2, D2) input of one of the differential detectors 616 as shown in FIG. 6A.

Where, as in the embodiment shown, the 2D array 602 is an array of mutual capacitance sense cells, the motion sensor can further include a TX Mux 618 to avoid excessive duplication of Tx drive circuits. Alternatively, where the 2D array 602 is an array of self-capacitance sense cells, the TX Mux 618 can be omitted and the 'Tx electrodes' electrically coupled to ground or a fixed voltage.

Signals (CC, CS, SC and SS) of the 2D array 602 of FIG. 6 can be calculated as follows:

$$CC = A\cos\left(\frac{2\pi x}{\Lambda}\right)\cos\left(\frac{2\pi y}{\Lambda}\right) \quad (3)$$

$$CS = A\cos\left(\frac{2\pi x}{\Lambda}\right)\sin\left(\frac{2\pi y}{\Lambda}\right) \quad (4)$$

$$SC = A\sin\left(\frac{2\pi x}{\Lambda}\right)\cos\left(\frac{2\pi y}{\Lambda}\right) \quad (5)$$

$$SS = A\sin\left(\frac{2\pi x}{\Lambda}\right)\sin\left(\frac{2\pi y}{\Lambda}\right) \quad (6)$$

where x is the displacement in the x dimension, y is the displacement in the y dimension, Λ frequency is of the output signal and A is a constant.

Again, it is noted that despite the 2D array 602 including multiple individual sense cells, grouped into multiple groups of blocks of sense cells 610, and providing eight wire-summed signals 614 coupled to four separate differential detectors 616, the entire system results in generation of only the four output signals (CC, CS, SC and SS). Because only four signals must be processed, the speed and memory requirements of the processor are much less than what is needed for other implementations of optical or capacitive motion sensors using image correlation. Again it will be understood that only four signals are generated and no fingerprint image is detected or stored in memory.

The displacement can then be determined from the four signals CC, CS, SC, and SS, by calculating "plus" and "minus" signals denoted as $P_I$, $P_Q$, $M_I$ and $M_Q$ and, defined as follows:

$$P_I = CC - SS \quad (7)$$

$$P_Q = CS + SC \quad (8)$$

$$M_I = CC + SS \quad (9)$$

$$M_Q = CS - SC \quad (10)$$

These P and M signals can be treated as vectors, where the magnitude is proportional to the strength of the signal, and the phase represents displacement along the sense cells. A phase rotation of 360 degrees represents a motion displacement of Λ, the separation of the sense cells.

Although the 2D array 600 in FIGS. 6A and 6B is shown and described above as having a particular number of blocks of sense cells 606 in the array, each with a particular number of individual sense cells 604 it will be understood that other embodiments and configurations are possible. By changing the settings of the Rx and Tx multiplexers (not shown in these figures) to change the sense cells 604 driven by the Tx multiplexer, and/or coupled to the differential detector 608 by the Rx multiplexer, both the number of blocks of sense cells 606 in the 2D array 600, and the number of individual sense cells 604 in each block of sense cells can be increased or decreased. Briefly, the method involves configuring the Rx and Tx multiplexers for CC signal generation, scanning and measuring the CC signal; configuring the Rx and Tx multiplexers for CS signal generation, scanning and measuring the CS signal; configuring the Rx and Tx multiplexers for SS signal generation, scanning and measuring the SS signal; and configuring the Rx and Tx multiplexers for SC signal generation, scanning and measuring the SC signal. Adding blocks of sense cells 606 gives a higher signal strength but results in a larger array area and reduces a bandwidth of spatial frequency detection limiting types of surfaces that can be detected, thus creating a tradeoff that can be optimized for a given application. Larger block of sense cells 606, i.e., a block of sense cells including a larger number of individual sense cells 604, provides better motion precision, but limits the type of surface that can be tracked; creating a tradeoff that can be optimized for a given application.

Figure 7:
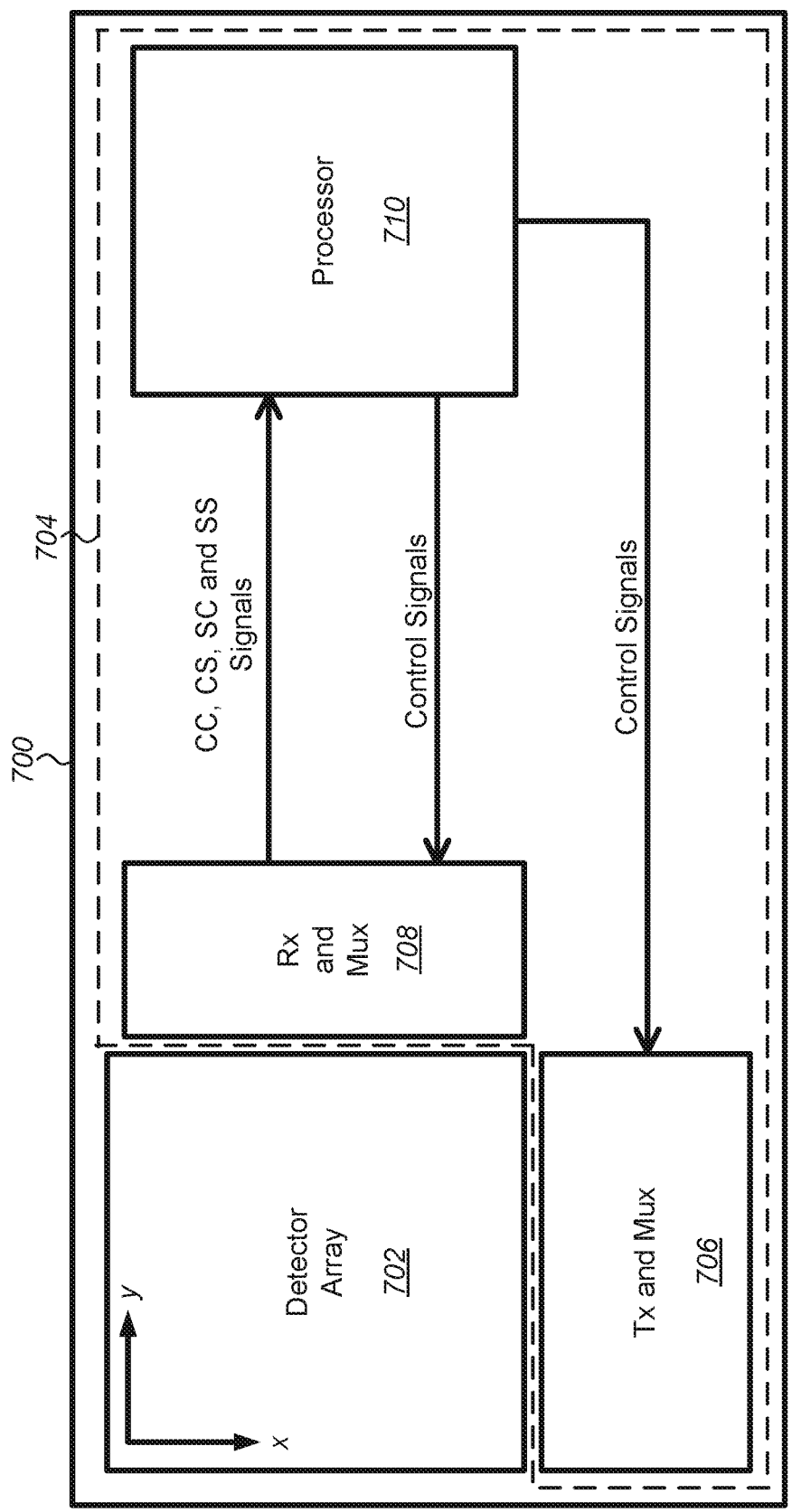
FIG. 7 is a schematic block diagram of a capacitive motion sensor including an array of capacitance sense cells, and using spatial frequency based detection for detecting motion in two-dimensions.

FIG. 7 is a schematic block diagram of a capacitive motion sensing system or motion sensor 700 including a 2D array 702 of capacitance sense cells, and using spatial frequency based detection for detecting motion in two-dimensions. Referring to FIG. 7, the motion sensor 700 includes, in addition to the 2D array 702, processing circuitry 704 to process motion dependent output signals from the 2D array to measure motion of a surface in a direction parallel to a surface of the 2D array. In the embodiment shown, the processing circuitry 704 includes a transmission drive circuit and multiplexer (Tx and MUX 706) to drive Tx electrodes (not shown in this figure) of the 2D array 702, and receive-sensing-circuit and multiplexer (Rx and MUX 708), and a processor 710. As described above, the processor 710 controls the Rx and MUX 708 to combine output signals from the 2D array 702 to generate four signals (CC, CS, SC and SS) which contain in-phase and quadrature information from output signals from the 2D array arising from motion along the x and y axes. The processor 710 then executes a program or algorithm to calculate motion based on the four signals (CC, CS, SC and SS) output from the Rx and MUX 708 and by equations (7) through (10) above.

Because only four signals must be processed, the processing time, processing power and memory requirements of the processor 710 are much less than what is needed for other implementations of optical or capacitive motion sensors using image correlation, thereby enabling detection and measurement of faster motion for a given sample and process time than in previous motion sensors. A spatial-frequency-based capacitive motion sensor including a 1D or 2D array as described above can detect motion beyond 1,000 mm/second, with less required processing power, and with much smaller array or sensing area. In one embodiment, a spatial-frequency-based capacitive motion sensor including a 2D array was implemented with less than 4×4 mm sensing area, and less than 10% loading of a 48 MHz processor. Typical trackpads are roughly 25×25 mm, and capacitive motion sensors using image correlation generally cannot achieve more than 100 mm/second tracking speed.

It will be further understood that the spatial-frequency-based capacitive motion sensors of the present disclosure achieve these results without the security concerns of detecting, processing and storing a fingerprint image. With the settings of the Rx MUX 708 and Tx MUX 706 under direct control of the processor 710 and unavailable to outside control, the 2D array 702 cannot be used to capture an image of the sensed surface, making it impossible to read, store, or report fingerprint images. This inability to read, store or report fingerprint images. is a desirable security feature.

Components of the motion sensor 700 can be implemented in one or more integrated circuits (ICs) or can implemented as discrete components packaged within a common multi-chip module (MCM) or mounted to a printed circuit board (PCB), can be integrally formed as a single IC on common or shared substrate. For example, in one embodiment the 2D array 702, Tx and MUX 706 and Rx and MUX 708, can be integrally formed as a single IC mounted to a PCB or packaged with a processor 710 formed on a separate IC.

FIGS. 8A through 8D are block diagrams of a portion of a motion sensor including 2D array 800, a transmit multiplexer (Tx MUX 802), a receive multiplexer (Rx MUX 804), a differential detector 806, and a Tx drive circuit 808. The Tx MUX 802 and the Rx MUX 804 in each of these figures are configured to generate one of the four signals (CC, CS, SC, and SS).

Figure 8A:
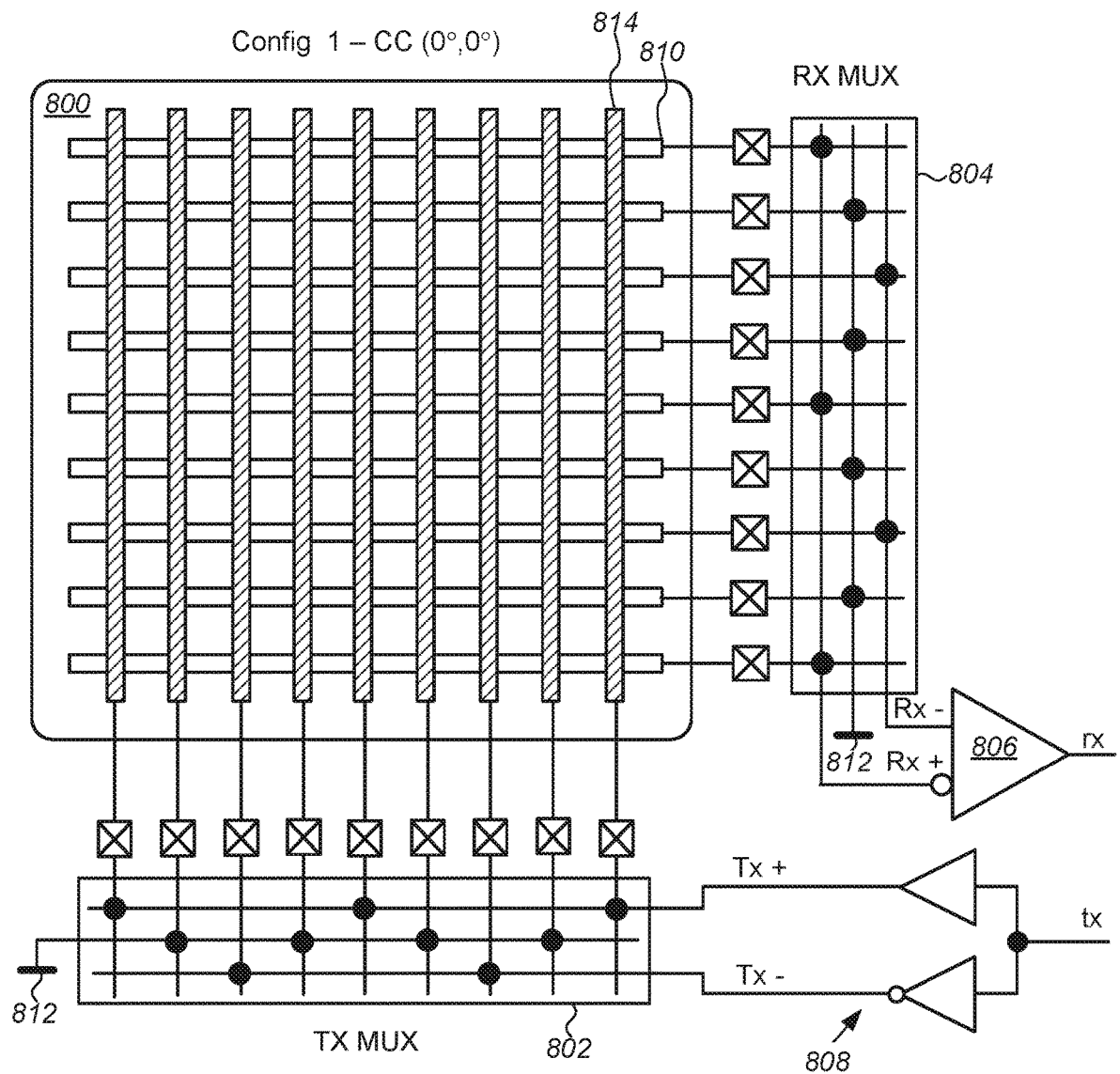
FIG. 8A is a block diagram of a portion of a motion sensor including 2D array with pre-configured transmit and receive multiplexers (MUX), and a differential detector configured to generate a first signal (CC) of four signals (CC, CS, SC, SS)

FIG. 8A illustrates a first configuration in which the Tx MUX 802 and the Rx MUX 804 are configured as shown and a detection scan executed to generate the CC signal.

Figure 8B:
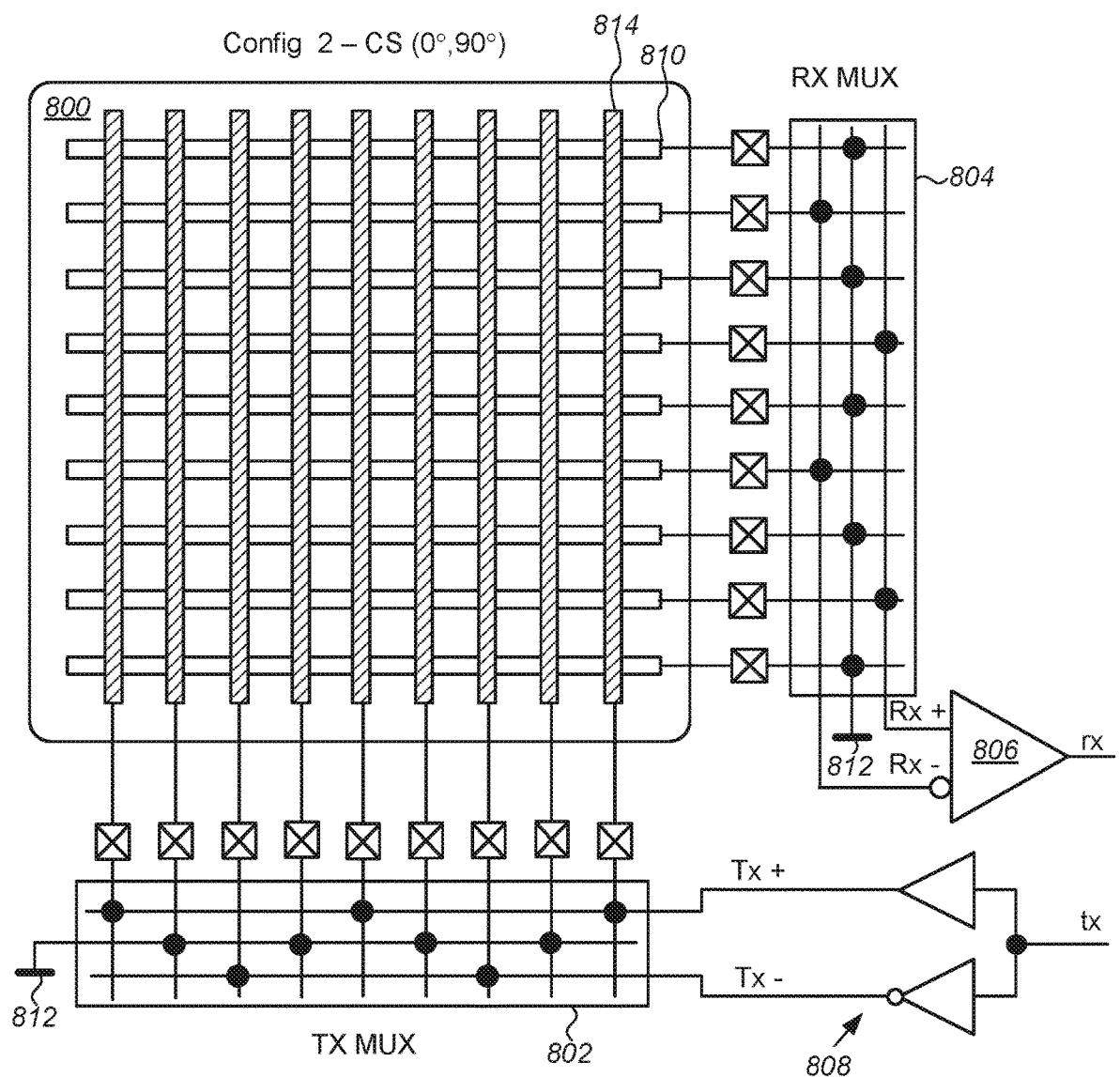
FIG. 8B is a block diagram of a portion of a motion sensor including 2D array with pre-configured transmit and receive MUXs, and a differential detector configured to generate a second signal (CS) of the four signals.

In a second configuration shown in FIG. 8B the configuration of the Tx MUX 802 remains the same, while the Rx MUX 804 is reconfigured to change the receive (Rx) electrodes 810 which are coupled to an electrical ground 812, which Rx electrodes are connected together to couple to a inverting input (Rx−) of the differential detector 806, and which Rx electrodes are connected together to couple to a non-inverting input (Rx+) of the differential detector. A second detection scan is then executed to generate the CS signal.

Figure 8C:
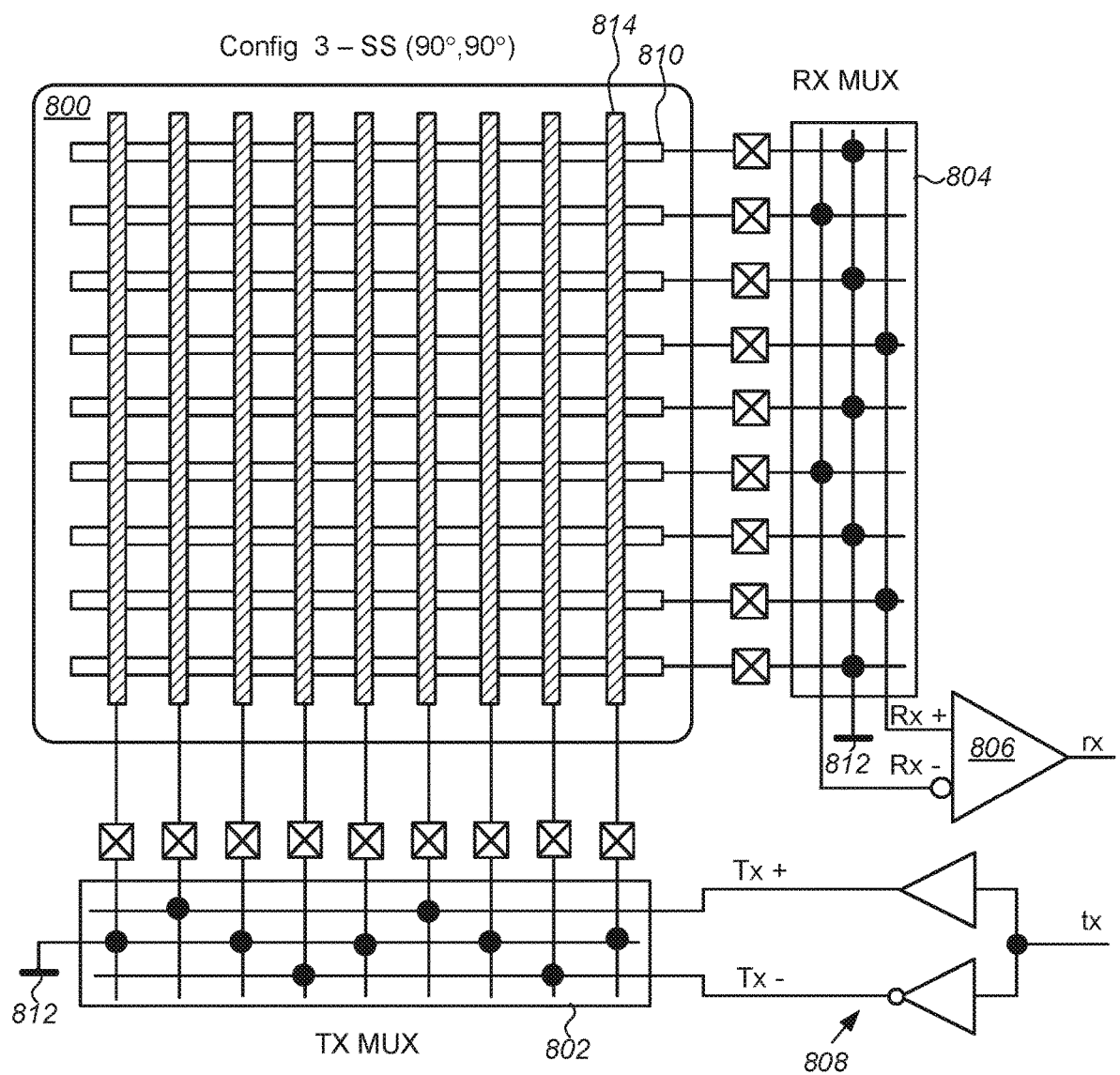
FIG. 8C is a block diagram of a portion of a motion sensor including 2D array with pre-configured transmit and receive MUXs, and a differential detector configured to generate a third signal (SC) of the four signals.

In a third configuration shown in FIG. 8C the configuration of the Rx MUX 804 remains unchanged from that shown in FIG. 8B, while the Tx MUX 802 is reconfigured to change the transmit (Tx) electrodes 814 which are coupled to electrical ground 812, which Tx electrodes are connected together to couple to a positive drive signal (Tx+) of the Tx drive circuit 808, and which Tx electrodes are connected together to couple to a negative drive signal (Tx−) of the Tx drive circuit. A third detection scan is then executed to generate the SC signal.

Figure 8D:
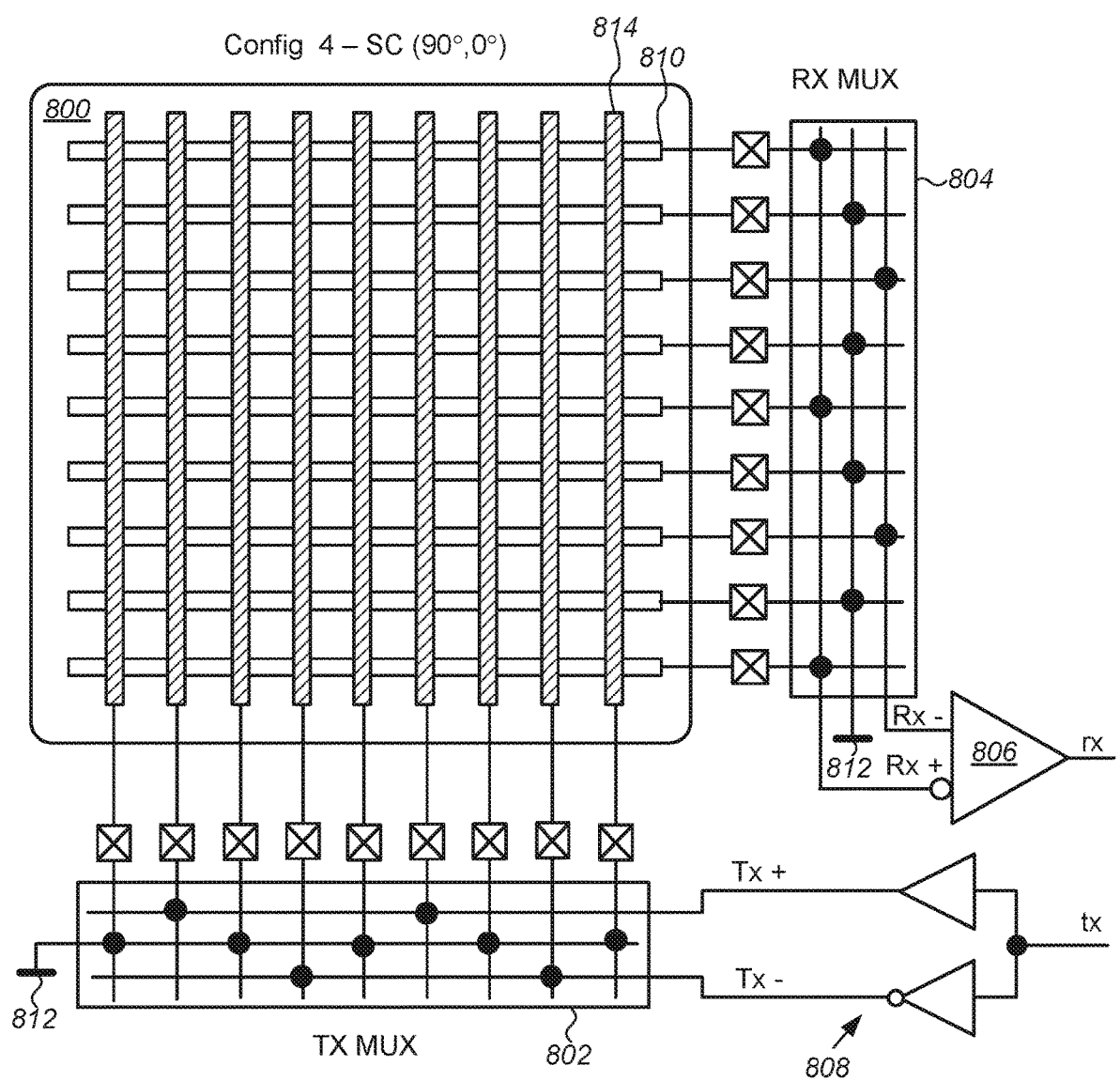
FIG. 8D is a block diagram of a portion of a motion sensor including 2D array with pre-configured transmit and receive MUXs, and a differential detector configured to generate a fourth signal (SS) of the four signals.

In a fourth configuration shown in FIG. 8D the configuration of the Tx MUX 802 remains unchanged from that shown in FIG. 8C, while the Rx MUX 804 is reconfigured to change the Rx electrodes 810 which are coupled to an electrical ground 812, which Rx electrodes are connected together to couple to the inverting input (Rx−) of the differential detector 806, and which Rx electrodes are connected together to couple to the non-inverting input (Rx+) of the differential detector. A fourth detection scan is then executed to generate the SS signal.

These four signals (CC, CS, SC, SS) are then used by the processor (not shown in this figure) executing a program or algorithm to calculate motion based on the four signals.

In certain embodiments, a center or peak spatial frequency of the array is selected to substantially match a spatial frequency component in capacitance variations arising from variations in the structure of a surface moved relative to a motion sensor. For example, where the surface being moved is a finger or fingertip, one common cause of these variations is from the ridges and valleys of a fingerprint. A mean distance or period between ridges in a fingerprint, commonly referred to as Mean Ridge Breadth or MRB, is user dependent, and varies from 300 to 600 μm depending on age, gender, height or size, and ethnicity of a user. The peak frequency or range of frequencies over which the array can function as a comb-filter is generally determined by a physical spacing or pitch between the sense cells. However, the processing circuitry of the motion sensor of the present disclosure is capable of being dynamically and, in some embodiments, automatically changed by the processor controlling the Rx Mux to change interconnection between sense cells. Therefore it is possible to match the peak spatial frequency of the array to a particular MRB to maximize signal strength, tracking speed and accuracy.

In one embodiment, the motion sensor includes an array configured as a comb-filter in which the peak frequency can be dynamically adjusted to achieve lower peak frequencies by having more grounded sense cells between sense cells which are driven by transmit (Tx) electrodes or sensed by receive (Rx) electrodes, or by connecting fewer Rx electrodes. In one version of this embodiment, shown in FIGS. 9A through 9C, the sense cells are grounded by configuring a Tx MUX 900 using the processor (not shown in these figures) so that alternate Tx electrodes 902 are coupled to an electrical ground 904 and the sense cells associated with these grounded electrodes are not driven by Tx signals and substantially do not accumulate any charge, or measurable change in capacitance.

Figure 9A:
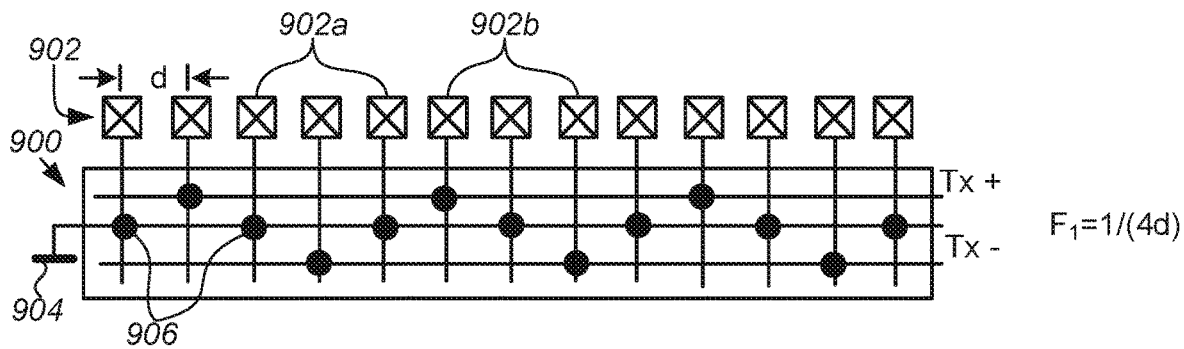
FIG. 9A is a block diagrams illustrating a first alternate configuration of a transmit multiplexer in which various transmit electrodes are grounded to enable dynamic adjustment of a center or peak spatial frequency of the array.

Referring to FIG. 9A, in a first embodiment a processor of the motion sensor (not shown in these figures) executes a program to operate or configure the Tx MUX 900 so that alternate Tx electrodes 902a are grounded through nodes 906. The processor then drives the ungrounded Tx electrodes 902b positive and negative drive signals (Tx+, Tx−), providing an array center or peak frequency $F_1$ equal to $1/(4d)$, where d is a spacing between adjacent Tx electrodes.

Figure 9B:
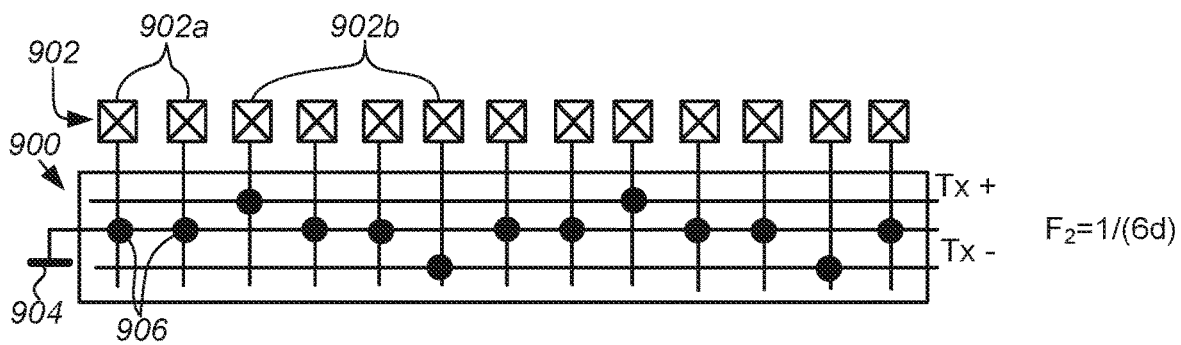
FIG. 9B is a block diagrams illustrating a second alternate configuration of a transmit multiplexer in which various transmit electrodes are grounded to enable dynamic adjustment of a center or peak spatial frequency of the array.

Referring to FIG. 9B, in a second embodiment the processor configures the Tx MUX 900 so that pairs of adjacent grounded Tx electrodes 902a between ungrounded Tx electrodes 902b provide an array peak frequency of $F_2$ equal to $1/(6d)$.

Figure 9C:
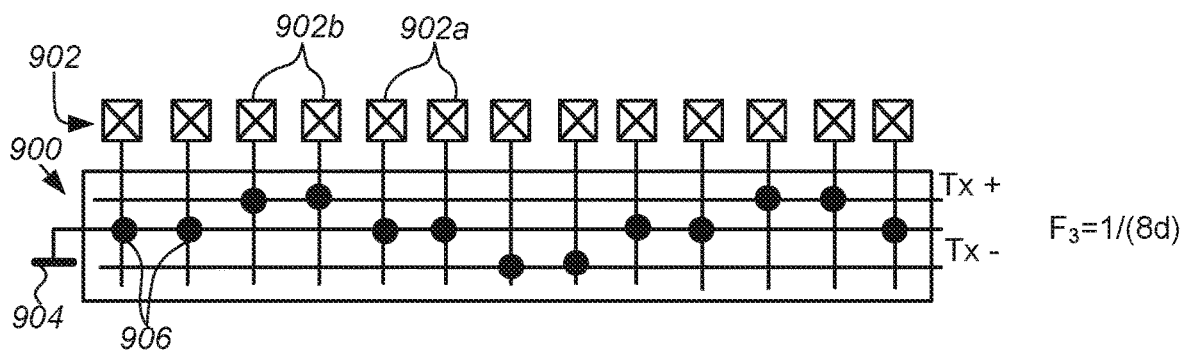
FIG. 9C is a block diagrams illustrating a third alternate configuration of a transmit multiplexer in which various transmit electrodes are grounded to enable dynamic adjustment of a center or peak spatial frequency of the array.

Referring to FIG. 9C, in a third embodiment the processor configures the Tx MUX 900 so that pairs of adjacent grounded Tx electrodes 902a between pairs of ungrounded Tx electrodes 902b are grounded, providing an array peak frequency of $F_3$ equal to $1/(8d)$.

In operation, the processor of the motion sensor can be configured to automatically execute a number of detection scans at two or more of the different array peak frequencies, $F_1$, $F_2$ and $F_3$, and make decision as to data from which scan cycle is used for processing the displacement (motion) calculations based on signal magnitudes ($S_{F1}$, $S_{F2}$ and $S_{F3}$) of the output signals from the array at peak frequencies, $F_1$, $F_2$ and $F_3$. The signal magnitudes ($S_{F1}$, $S_{F2}$ and $S_{F3}$) can be calculated using the following formula:

$$S_{Fx}=(P_i^2+P_q^2+M_i^2+M_q^2)_{Fx} \quad (11)$$

where $P_i$ is the in-phase plus vector determined from CC−SS, as described above; $P_q$ is the quadrature plus vector determined from CS+SC; $M_i$ is the in-phase minus vector determined from CC+SS; and $M_q$ is the quadrature minus vector determined from CS−SC.

It is noted that the scan at the selected peak frequency need not be repeated before calculating the displacement (motion), since the output signals used to calculate signal magnitude can also be used to calculate displacement. Similarly, it not necessary that multiple detection scans at each of the different array peak frequencies, $F_1$, $F_2$ and $F_3$, be repeated each time after detecting a surface in proximity to the motion sensor and before calculating displacement, since it is likely that MRB will not change either greatly or quickly in a short period of time. Rather the processor can be configured to check signal magnitudes ($S_{F1}$, $S_{F2}$ and $S_{F3}$) after a predetermined time or following a predetermined number of scans, or when the signal magnitude of the peak frequency being used drops below a predetermined threshold.

Figure 10:
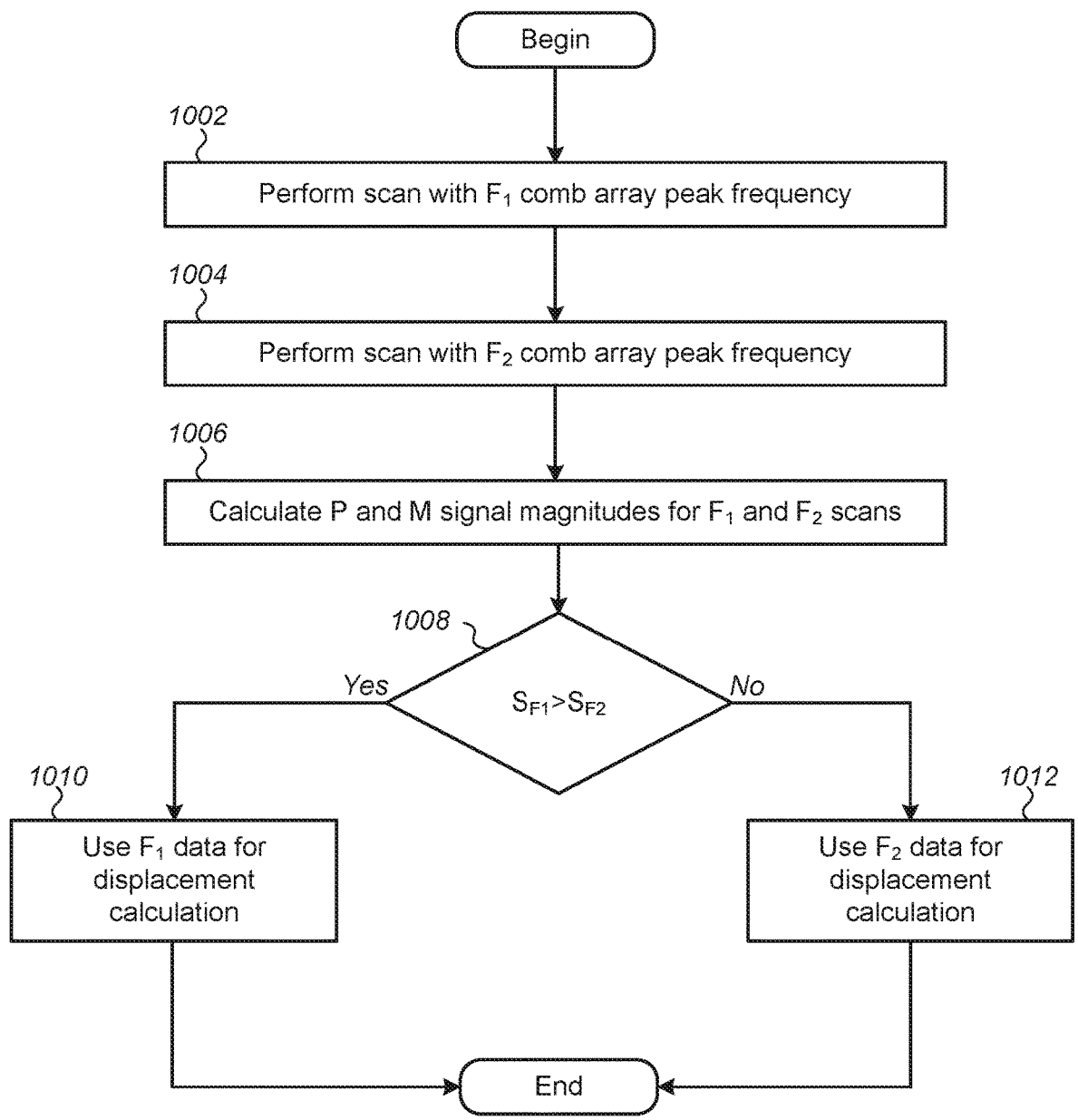
FIG. 10 is a flowchart of a method for operating a spatial frequency based motion sensor including an array of capacitance sense cells capable of being configured as a multi-frequency spatial filter.

A method for operating a multi-frequency spatial frequency based capacitive motion sensor will now be described with reference to FIG. 10. FIG. 10 is a flowchart showing a spatial frequency based method for operating a motion sensor including an array of capacitance sense cells capable of being configured or re-configured as a multi-frequency spatial filter in which lower peak frequencies are achieved by grounding one or more transmit (Tx) electrodes between the inter-connected sense cells, as shown in FIGS. 10A through 10C. Referring to FIG. 10, the method begins with configuring the Tx MUX 1000 as shown in FIG. 10A so that alternate Tx electrodes 1002 are grounded providing an array peak frequency of $F_1$, and performing a scan of receive (Rx) electrodes of the array (step 1002). Next, the Tx MUX 1000 as shown in FIG. 10B so that pairs of Tx electrodes 1002 are grounded between each pair of ungrounded Tx electrodes providing an array peak frequency of $F_2$, and performing a second scan of Rx electrodes of the array (step 1004). The plus (P) and minus (M) signal magnitudes ($S_{F1}$ and $S_{F2}$) are then calculated for the $F_1$ and $F_2$ scans using the formulas given above (step 1006). Signal magnitudes $S_{F1}$ and $S_{F2}$ are then compared (step 1008). If the signal magnitude $S_{F1}$ is greater than the signal magnitude $S_{F2}$, $F_1$ data is used for the displacement (motion) calculations (step 1010). If the signal magnitude $S_{F1}$ is not greater than the signal magnitude $S_{F2}$, $F_2$ data is used for the displacement (motion) calculations (step 1012). Although, the method for operating a multi-frequency spatial frequency based capacitive motion sensor described above and shown in FIG. 10 uses scans at only two peak frequencies, $F_1$ and $F_2$, it will be understood that because the reconfiguring of the Tx MUX 1000 as well as the calculations are performed automatically and rapidly by the processor in the motion sensor, the method can be extended to performing additional scans at multiple peak frequencies, for example at $F_1$, $F_2$, and $F_3$, as described above with reference to FIGS. 10A through 10C, without significant reduction in the performance of the motion sensor.

Figures 11A, 11B:
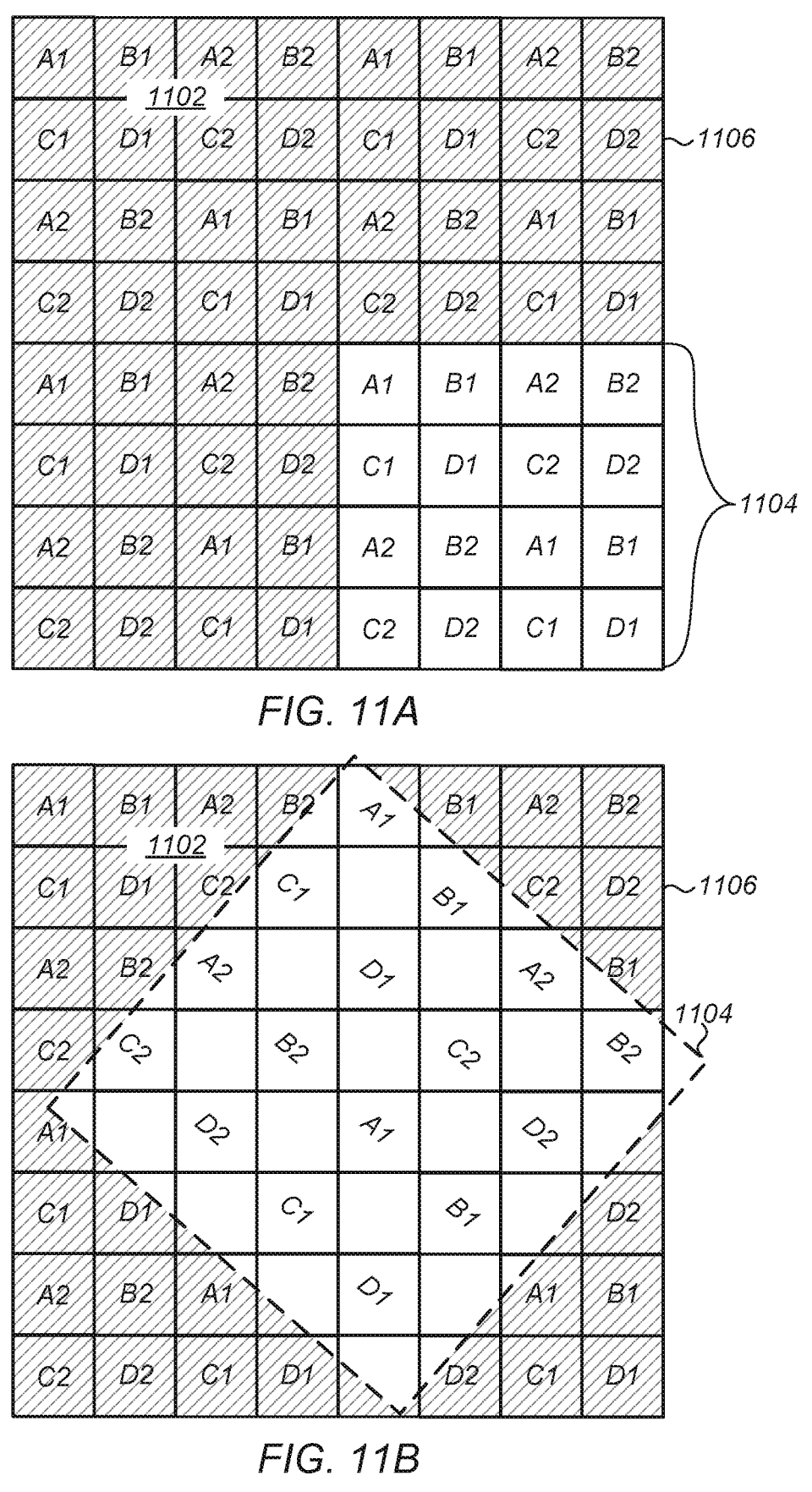

In another embodiment, illustrated with reference to FIGS. 11A and 11B, the processing circuitry of the motion sensor can be used to change a size, shape or orientation of the blocks of sense cells in a 2D array. FIG. 11A illustrates a portion of a 2D array 1102 including four blocks of sense cells 1104, each having sense cells 1106 arranged in a 4×4 elements-per-cell (or 4×4 elements/period) configuration. The sense cells 1106 within each block of sense cells 1104, as well as the blocks of sense cells are electrically connected or wire-summed to yield eight signals, A1 through D2 as shown and described above with reference to FIGS. 6A and 6B. Referring to FIG. 11B, the interconnections between sense cells 1106 have been changed using the multiplexers to effectively rotate the orientation of the blocks of sense cells 1104 in the 2D array 1102 by 45 degrees, increasing the pitch or spacing between individual sense cells in the block of sense cells and resulting in a change in peak spatial frequency approximately 41%.

Figure 12:
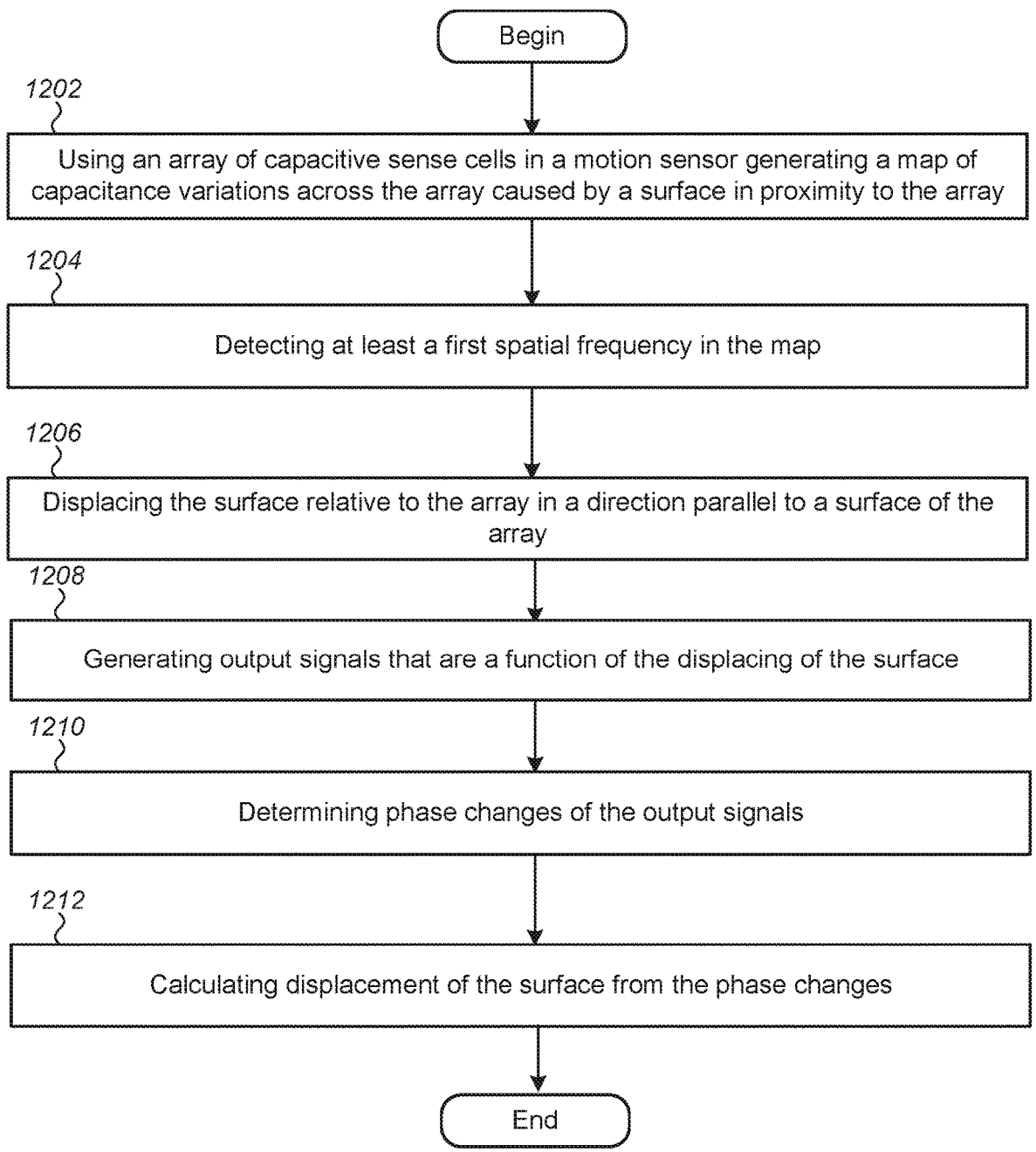
FIG. 12 is a flowchart of a method for operating a spatial frequency based motion sensor including an array configured as a comb-filter.

A method of operating a spatial frequency based capacitive motion sensor will now be described with reference to the flowchart of FIG. 12. Referring to FIG. 12, in a first step, using an array of capacitive sense cells in a motion sensor a map is generated of capacitance variations across the array caused by a surface in proximity to the array (step 1202). As shown and described above with respect to FIGS. 5 and 6A and 6B, this can be accomplished by configuring the array as a comb-filter to generate a map of the capacitance variations at just a single spatial frequency. Alternatively, generating the capacitance map can include full capacitance-map image of the surface, from which at least one spatial-frequency can be subsequently detected. Next, the spatial frequency is detected in capacitance variations across the array caused by a surface in proximity to the array (step 1204), and the surface moved or displaced relative to the array in a direction parallel to a surface of the array (step 1206). This displacement of the surface results in generating output signals that are a function of the displacing of the surface, and which are periodic signals at the spatial frequency (step 1208). As described above where the array is a 2D array including at least two non-parallel axes, this step generally includes combining output signals from the 2D array to generate four signals (CC, CS, SC and SS) which contain in-phase and quadrature information arising from motion along the axes. The processor then executes a program or algorithm to calculate motion based on the four signals (CC, CS, SC and SS) output from the Rx and MUX and by equations (3) through (6) above. Phase changes of the output signals are then measured (step 1210), and displacement of the surface relative to the array determined from the output signals, by calculating P and M signals using equations (7) through (10) (step 1212). As noted above, these $P_I$, $P_Q$, $M_I$ and $M_Q$ can be treated as vectors, where the magnitude is proportional to the strength of the signal, and the phase represents displacement along the sense cells.

It is to be understood that the spatial-frequency-based capacitive motion sensors including a 1D or 2D array described herein can be included in any system or device that requires motion sensing of a surface. Examples include a finger navigations system for use with a computer or a mobile device to input data, scroll or select an item on scroll list, or reposition a cursor in an icon field or image on a display. Furthermore, because the spatial-frequency-based capacitive motion sensors are rugged devices, immune to environment conditions such as vibration and ambient lighting, they are particularly suited for use in a user interface mounted on a steering wheel, dashboard, or console of an automobile, performs tasks based on the motion, such as changing audio volume, seat position, climate control temperature, etc.

It will further be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Thus, a spatial frequency based motion sensor including an array of capacitive sense cells and using spatial frequency detection to detect motion of a surface relative to the array have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A motion sensor comprising:
   an array of sense cells to capacitively sense capacitance variations in a structure of a detected surface in proximity to the array; and
   processing circuitry comprising a multiplexer and a processor to process motion dependent output signals from the array to measure motion of the detected surface in a direction parallel to a sensing surface of the array,
   wherein the processor is adapted to execute a program to control the multiplexer to interconnect the sense cells of the array into at least two interleaved groups of sense cells, each sense cell of a group of sense cells spaced apart in a periodic manner based on an estimation of a spatial frequency content of the capacitance variations in the structure of the detected surface to configure the array as a comb-filter to detect at least one spatial frequency component of the capacitance variations, and to measure motion of the detected surface in a direction parallel to the array.

2. The motion sensor of claim 1 wherein the array comprises a sensing area smaller than the detected surface moved in relation thereto.

3. The motion sensor of claim 1 wherein the array is a two-dimensional array comprising sense cells arranged along at least two non-parallel axes.

4. The motion sensor of claim 3 wherein the processing circuitry further comprises a differential detector coupled between multiplexer and the processor to generate four signals comprising in-phase and quadrature signals from output signals from the two-dimensional array arising from motion along the two non-parallel axes.

5. The motion sensor of claim 4 wherein the processor is further adapted to process the four signals to generate vectors in each direction along the two non-parallel axes, wherein magnitude of the vectors represents strength of the quadrature signals and changes in direction of the vectors represent motion along the two non-parallel axes.

6. The motion sensor of claim 5 wherein the processor is further adapted to control the multiplexer to change interconnections of the sense cells to change a frequency of the spatial frequency component sensed by the sense cells of the array.

7. The motion sensor of claim 6 wherein the processor is further adapted to compare strength of the four signals at different frequencies of the spatial frequency component sensed by the sense cells of the array, and control the multiplexer to select the frequency of output signals having the greatest strength for the detected surface for which motion is being detected.

8. The motion sensor of claim 1 wherein the array is a mutual capacitance array comprising a plurality of receive (Rx) electrodes extending in a first direction, and a plurality of transmit (Tx) electrodes extending in a second direction not parallel with the first direction, the plurality of Rx electrodes separated from the Tx electrodes by an insulator, and wherein each intersection of Tx and Rx electrodes forms a mutual capacitance sense cell in the array.

9. The motion sensor of claim 1 wherein the array is a self-capacitance array comprising a plurality of first electrodes coupled to the processing circuitry and extending in a first direction, and a plurality of second electrodes coupled to a DC voltage level and extending in a second direction not parallel with the first direction, the plurality of first electrodes separated from the second electrodes by an insulator, and wherein each intersection of first and second electrodes forms a self-capacitance sense cell in the array.

10. The motion sensor of claim 1 wherein the detected surface is a surface of a finger, and the capacitance variations in the structure of the detected surface arise from ridges and valleys of a fingerprint.

11. The motion sensor of claim 10 wherein an image of the fingerprint is neither generated by the motion sensor nor stored in a memory coupled thereto.

12. The motion sensor of claim 1 wherein the detected surface is a surface of a glove, and the capacitance variations in the structure of the detected surface arise from a texture of fabric on the surface of the glove.

13. A motion sensor comprising:
a two-dimensional (2D) array of sense cells arranged along at least two non-parallel axes to capacitively sense capacitance variations arising from ridges and valleys of a fingerprint of a finger in proximity to the 2D array; and
processing circuitry comprising a processor to interconnect the sense cells of the 2D array into at least two interleaved groups of sense cells, each sense cell of a group of sense cells spaced apart in a periodic manner based on an estimation of a spatial frequency content of the capacitance variations in the structure of the fingerprint to configure the 2D array as a comb-filter to detect at least one spatial frequency component of the capacitance variations, and to measure motion of the finger in a direction parallel to the 2D array,
wherein an image of the fingerprint is neither generated by the motion sensor nor stored in a memory attached thereto.

14. The motion sensor of claim 13 wherein the processing circuitry is configured to generate four signals comprising in-phase and quadrature signals from output signals from the 2D array arising from motion of the finger.

15. The motion sensor of claim 14 wherein the processor is configured to change interconnections of the sense cells to change a frequency of the spatial frequency component sensed by the sense cells of the 2D array.

16. The motion sensor of claim 15 wherein the processor is further adapted to compare strength of the four signals at different frequencies of the spatial frequency component sensed by the sense cells of the 2D array, and to change interconnections of the sense cells to select the frequency of the spatial frequency component in which the four signals have the greatest strength.

17. The motion sensor of claim 1 wherein the detected surface is a surface of a stylus, and the capacitance variations in the structure of the detected surface arise from arise from variations in the surface of the stylus.

18. A method comprising:
using an array of capacitive sense cells in a motion sensor generating a map of capacitance variations across the array caused by a detected surface in proximity to the array;
detecting at least a first spatial frequency in the map;
displacing the detected surface relative to the array in a direction parallel to a sensing surface of the array;
generating output signals that are a function of the displacing of the detected surface, wherein the output signals are periodic signals at the first spatial frequency;
determining phase changes of the number of output signals; and
calculating displacement of the detected surface from the phase changes,
wherein generating a map of capacitance variations comprises interconnecting the capacitive sense cells of the array into at least two interleaved groups of sense cells, each sense cell of a group of sense cells spaced apart in a periodic manner based on an estimation of the first spatial frequency to configure the array as a comb-filter to generate the map of the capacitance variations at the first spatial frequency.

19. The method of claim 18 wherein generating a map of capacitance variations comprises generating a full capacitance-map image of the detected surface.

20. The method of claim 18 wherein configuring the array comprises interconnecting outputs from a first group of sense cells, and interconnecting outputs from a second group of sense cells such that the interconnected sense cells of each group are interleaved and spaced apart along at least one axis in the array at an interval proportional to the first spatial frequency.

* * * * *